US005533014A

United States Patent [19]
Willars et al.

[11] Patent Number: 5,533,014
[45] Date of Patent: Jul. 2, 1996

[54] NON-CONTINUOUS TRANSMISSION FOR SEAMLESS HANDOVER IN DS-CDMA SYSTEMS

[75] Inventors: Per H. A. Willars, Stockholm; Olof E. Grimlund, Hasselby; Lars-Magnus Ewerbring, Stockholm, all of Sweden

[73] Assignee: Telefonaktiebolaget LM Ericsson, Stockholm, Sweden

[21] Appl. No.: 431,458

[22] Filed: May 1, 1995

Related U.S. Application Data

[63] Continuation of Ser. No. 75,892, Jun. 14, 1993, abandoned.

[51] Int. Cl.$^6$ .................................................. H04J 13/00
[52] U.S. Cl. ................................................. 370/18; 375/206
[58] Field of Search ....................... 370/18, 19, 95.1, 370/111, 21, 22, 101, 110.1, 110.4, 118, 77, 79, 80, 99; 455/33.1, 33.2, 67; 375/200, 201, 202, 203, 204, 205, 206, 208, 209, 210; 379/60

[56] References Cited

U.S. PATENT DOCUMENTS

| | | | |
|---|---|---|---|
| 4,653,076 | 3/1987 | Jerrim et al. | 370/18 |
| 4,930,140 | 5/1990 | Cripps et al. | 375/1 |
| 5,042,082 | 8/1991 | Dahlin | 455/33 |
| 5,095,540 | 3/1992 | Reed | 370/111 |
| 5,101,501 | 3/1992 | Gilhousen et al. | 455/33 |
| 5,109,528 | 4/1992 | Uddenfeldt | 455/33.2 |
| 5,151,919 | 9/1992 | Dent | 375/1 |
| 5,157,661 | 10/1992 | Kanai et al. | 370/95.1 |
| 5,175,867 | 12/1992 | Wejke et al. | 455/33.1 |
| 5,239,557 | 8/1993 | Dent . | |
| 5,274,667 | 12/1993 | Olmstead . | |

FOREIGN PATENT DOCUMENTS

| | | |
|---|---|---|
| 63-318837 | 12/1988 | Japan . |
| 51-2943 | 4/1993 | Japan . |
| 5-102943 | 4/1993 | Japan . |

OTHER PUBLICATIONS

H. Eriksson et al., "Multiple Access Options For Cellular Based Personal Communications," *IEEE Vehicular Technology Conference*, vol. 43, May 18–20, 1993, pp. 957–962.

D. J. Goodman, "Second Generation Wireless Information Networks," *IEEE Transactions on Vehicular Technology*, vol. 40, No. 2, May 1991, pp. 366–374.

D. J. Goodman, "Trends in Cellular and Cordless Communications," *IEEE Communications Magazine*, Jun. 1991, pp. 31–40.

Proakis, "5.2.10 Interleaving of Coded Data for Channels with Burst Errors," *Digital Communications*, McGraw-Hill, New York, pp. 440–441 (1989).

Per Willars, "Methods for MAHO between RF Frequencies," TR45.5.3./92.11.11, 10–20 Nov. 1992, pp. 1–3, in particular Section 4, p. 3.

HÅkan Eriksson et al., "Multiple Access Options for Cellular Based Personal Communications," *Proc. 43rd Vehic. Tech. Soc. Conf.*, Secaucus, 1993, pp. 1–6.

Gilhousen et al. "On the system design aspects of CDMA applied to digital cellular and Personal communications Networks", 1991, pp. 57–62.

*Primary Examiner*—Melvin Marcelo
*Assistant Examiner*—Huy D. Vu
*Attorney, Agent, or Firm*—Burns, Doane, Swecker & Mathis

[57] ABSTRACT

Introduction of discontinuous transmission in CDMA communications techniques is achieved by using a lower spreading ratio, whereby the spread information only fills an information part of a frame in a compressed mode, leaving an idle part of the frame in which to perform other functions, such as evaluation of other frequencies and execution of seamless handover between frequencies.

37 Claims, 2 Drawing Sheets

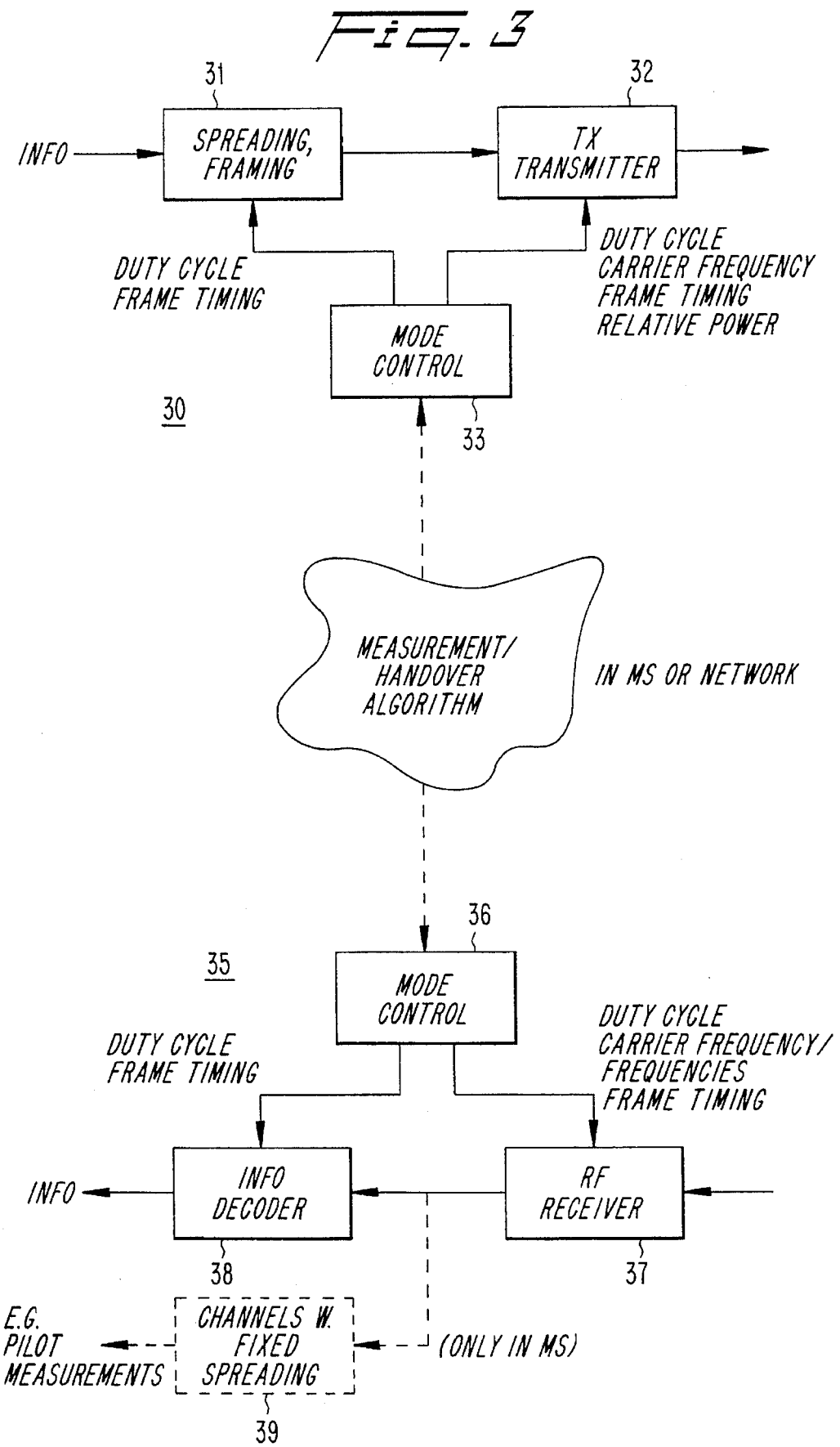

NON-CONTINUOUS TRANSMISSION FOR SEAMLESS HANDOVER IN DS-CDMA SYSTEMS

This application is a continuation of application Ser. No. 08/075,892, filed Jun. 14, 1993, abandoned.

FIELD OF INVENTION

The present invention relates to the use of Code Division Multiple Access (CDMA) communications techniques in cellular radio telephone communication systems, and more particularly, to a method and apparatus for seamless handover of call links between frequencies by non-continuous transmission in a Direct Sequence-Code Division Multiple Access (DSCDMA) communication technique.

BACKGROUND OF THE INVENTION

CDMA or spread spectrum communications have been in existence since the days of World War II. Early applications were predominantly military oriented. However, today there has been an increasing interest in using spread spectrum systems in commercial applications. Some examples include digital cellular radio, land mobile radio, satellite systems, and indoor and outdoor personal communication networks referred to herein collectively as cellular systems.

Currently, channel access in cellular systems is achieved using Frequency Division Multiple Access (FDMA) and Time Division Multiple Access (TDMA) methods. In FDMA, a communication channel is a single radio frequency band into which a signal's transmission power is concentrated. Interference with adjacent channels is limited by the use of band pass filters which only pass signal energy within the specified frequency band. Thus, with each channel being assigned a different frequency, system capacity is limited by the available frequencies as well as by limitations imposed by channel reuse.

In TDMA systems, a channel consists of a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, the problem of interference from different relative signal strength levels is reduced.

With FDMA or TDMA systems or hybrid FDMA/TDMA systems, the goal is to insure that two potentially interfering signals do not occupy the same frequency at the same time. In contrast, Code Division Multiple Access (CDMA) allows signals to overlap in both time and frequency. Thus, CDMA signals share the same frequency spectrum in present day systems. In the frequency or the time domain, the multiple access signals appear to be on top of each other.

There are a number of advantages associated with CDMA communication techniques. The capacity limits of CDMA-based cellular systems are projected to be several times that of existing analog technology as a result of the properties of a wide band CDMA system, such as improved interference diversity, voice activity gating, and reuse of the same spectrum in interference diversity.

In principle, in a CDMA system the informational data stream to be transmitted is impressed upon a much higher rate data stream known as a signature sequence. Typically, the signature sequence data are binary, providing a bit stream. One way to generate this signature sequence is with a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique spreading code (signature sequence). The ratio between the signature sequence bit rate and the information bit rate is called the spreading ratio.

A plurality of coded information signals modulate a radio frequency carrier, for example by quadrature phase shift keying (QPSK), and are jointly received as a composite signal at a receiver. Each of the coded signals overlaps all of the other coded signals, as well as noise-related signals, in both frequency and time. If the receiver is authorized, then the composite signal is correlated with one of the unique codes, and the corresponding information signal can be isolated and decoded.

One CDMA technique, here called "traditional CDMA with direct spreading", uses a signature sequence to represent one bit of information. Receiving the transmitted sequence or its complement (the transmitted binary sequence values) indicates whether the information bit is a "0" or "1". The signature sequence usually comprises N bits, and each bit is called a "chip". The entire N-chip sequence, or its complement, is referred to as a transmitted symbol. The receiver correlates the received signal with the known signature sequence of its own signature sequence generator to produce a normalized value ranging from −1 to +1. When a large positive correlation results, a "0" is detected; when a large negative correlation results, a "1" is detected.

Another CDMA technique, here called "CDMA with direct spreading" allows each transmitted sequence to represent more than one bit of information. A set of code words, typically orthogonal code words or bi-orthogonal code words, is used to code a group of information bits into a much longer code sequence or code symbol. A signature sequence or scramble mask is modulo-2 added to the binary code sequence before transmission. At the receiver, the known scramble mask is used to descramble the received signal, which is then correlated to all possible code words. The code word with the largest correlation value indicates which code word was most likely sent, indicating which information bits were most likely sent. One common orthogonal code is the Walsh-Hadamard (WH) code.

In CDMA, also referred to as direct sequence CDMA (DS-CDMA) to distinguish it from frequency hopping CDMA, the "information bits" referred to above can also be coded bits, where the code used is a block or convolutional code. One or more information bits can form a data symbol. Also, the signature sequence or scramble mask can be much longer than a single code sequence, in which case a subsequence of the signature sequence or scramble mask is added to the code sequence.

For future cellular systems, the use of hierarchical cell structures will prove valuable in even further increasing system capacity. In this cell structure, part of the wave-band of a larger cell or macro cell is devoted to smaller cells or micro cells existing within the macro cell. For instance, micro cell base stations can be placed at a lamp post level along urban streets to handle the increased traffic level in congested areas. Each micro cell might cover several blocks of a street or a tunnel, for instance. Even in CDMA systems, the different types of cells (macro and micro) would or will operate at different frequencies so as to increase the capacity of the overall system. See, H. Eriksson et at., "Multiple Access Options For Cellular Based Personal Comm.," *Proc. 43rd Vehic, Tech. Soc. Conf.*, Secaucus, 1993. Reliable handover procedures must be supported between the different cell types, and thus between different frequencies.

In a cellular communication system such as disclosed in U.S. Pat. No. 5,101,501 to Gilhousen et at. (herein incorporated by reference), reliable handover between base stations is viable if the carrier frequency is not changed. The procedure used is called soft handover through macro-diversity, whereby the mobile station is connected to more than one base station simultaneously.

In this conventional CDMA cellular telephone system, each cell has several modulator-demodulator units or spread spectrum mediums. Each modem consists of a digital spread spectrum transmit modulator, at least one digital spread spectrum data receiver and a searcher receiver. Each modem at the base station can be assigned to a mobile station as needed to facilitate communications with the assigned mobile station. In many instances many modems are available for use while other ones may be active in communicating with respective mobile stations. In the Gilhousen system a handoff scheme is employed for a CDMA cellular telephone system in which a new base station modem is assigned to a mobile station while the old base station continues to service the call. When the mobile station is located in the transition region between the two base stations, it communicates with both base stations.

When mobile station communications are established with the new base station, e.g., the mobile station has good communications with the new cell, the old base station discontinues servicing the call. This soft handoff is in essence a make-before-break switching function. The mobile station determines the best new base station to which communications are to be transferred to from an old base station. Although it is preferred that the mobile station initiate the handoff request and determine the new base station, handoff process decisions may be made as in conventional cellular telephone systems wherein the base station determines when a handoff may be appropriate and, via the system controller, request neighboring cells to search for the mobile station signal. The base station receiving the strongest signal as determined by the system controller then accepts the handoff.

In the CDMA cellular telephone system, each base station normally transmits a "pilot carrier" signal. This pilot signal is used by the mobile stations to obtain initial system synchronization and to provide robust time, frequency and phase tracking of the base station transmitted signals.

In conventional DS-CDMA systems the mobile station is continuously occupied with receiving information from the network. In fact, DS-CDMA normally uses continuous reception and transmission in both link directions. Unlike TDMA, there are no idle time slots available to switch to other carrier frequencies, creating two problems related to handover between frequencies.

The first is reliable handover evaluation, i.e., the procedure of deciding whether to handover to a given base station on a given frequency is appropriate at a particular instant. Since the mobile station can not provide any inter-frequency measurements to a handover evaluation algorithm in the network or the mobile station, the handover decision will be made without full knowledge of the situation of the mobile station, and therefore can be unreliable.

The second problem is the handover execution. When a decision has been made to handover a call to another base station on another carrier frequency, the mobile station must drop the existing link (or links when the system is operating with macro-diversity), switch to the new carrier frequency, and initiate a new link. When the mobile station and the new base station are establishing synchronization, information will be lost and the call quality will degrade.

These problems could be solved by implementing two receivers in the mobile station, but this would involve an undesirable increase the amount of RF hardware needed.

SUMMARY OF THE INVENTION

To solve the problems outlined above, the present invention introduces discontinuous transmission into CDMA communications techniques. This is achieved by using a compressed mode wherein a lower spreading ratio is used such that the spread information only fills a part of a frame, referred to as the information part herein (also referred to herein as a first part). The information is compressed into the information part of the frame in this compressed mode, leaving a part of the frame, referred to herein as an idle part (also referred to herein as a second part), in which to perform other functions, such as evaluation of other frequencies and execution of seamless handover wherein a user does not detect the handover.

The use of normal and compressed mode frames provides the ability to exploit the advantages of slotted transmission/reception in hierarchical cell structures while using DS-CDMA. It is possible to measure on other carrier frequencies, thereby providing reliable handover decisions. Further, handover execution between carrier frequencies can be made seamless by establishing a new link before releasing the old one. This can be done without the need of two receivers.

BRIEF DESCRIPTION OF THE DRAWING

The features and advantages of the present invention will become apparent from the detailed description set forth below when taken in conjunction with the drawings, in which:

FIG. 3 is a block diagram of pertinent parts of the receiver and transmitter structure of the mobile and base stations.

DETAILED DESCRIPTION OF PREFERRED EMBODIMENTS

Figure 1:
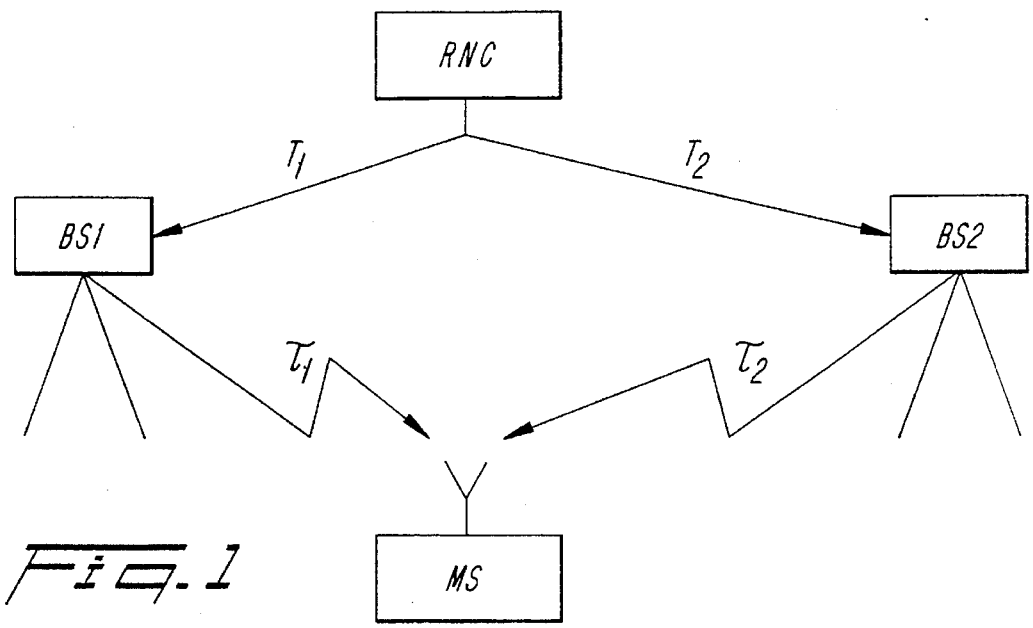
FIG. 1 is a schematic representation of communication links in a portion of a cellular communications system.

FIG. 1 illustrates a small portion of a cellular communications system including a mobile station MS and a first base station BS1 and a second base station BS2. In a practical system, there is a multiplicity of mobile stations and many base stations. The base stations BS1 and BS2 are interconnected by land lines $T_1$ and $T_2$ to a radio network controller RNC. The radio network controller RNC may include several layers of hierarchical structure, such as a mobile switching center (MSC) and base station controller.

Figure 2A:
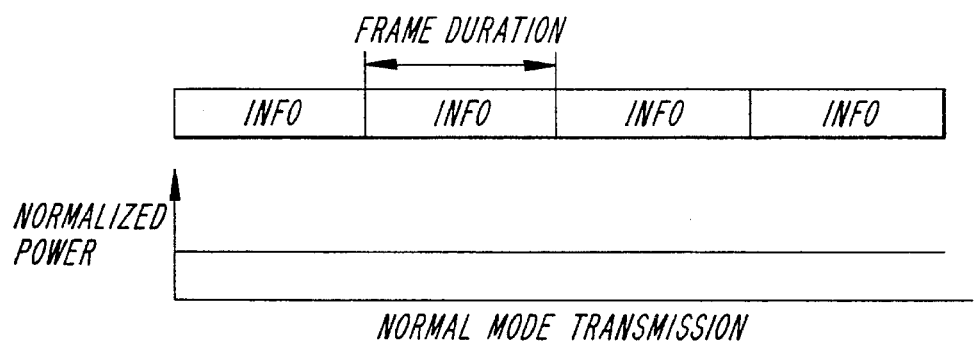
FIGS. 2A and 2B are examples of a normal mode transmission and a compressed mode transmission, respectively, during four frames.

Normally in CDMA systems, information is transmitted in a structure of frames with fixed length, e.g., 5–20 ms. Information to be transmitted within a frame is coded and spread together. The maximum allowable spreading ratio is conventionally used, resulting in continuous transmission during the whole frame, such as shown in FIG. 2A. Full frame transmission is denoted the normal mode transmission herein.

Figure 2B:
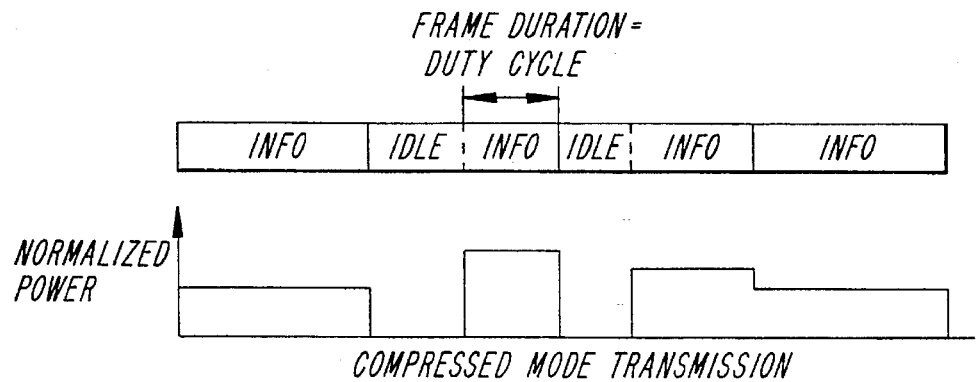

The present invention introduces discontinuous transmission into CDMA systems for, e.g., reliable handover evaluation and execution. This is achieved by using a lower spreading ratio, whereby the spread information only fills an information part of a frame in a compressed mode, leaving a residual, idle part idle in which no power is transmitted, as shown in FIG. 2B.

In the inventive method, this slotted code division multiple access communication technique impresses an informational data stream to be transmitted at a higher rate data signature sequence to produce coded information signals. The coded information signals are transmitted on a channel according to a frame structure comprising frames, each frame being of a specific time duration (e.g., 5–20 ms). In contrast to previous CDMA techniques, the coded information signal is transmitted discontinuously in the compressed mode wherein the frame includes an information part containing the coded information signal and an idle part wherein the coded information signal is not transmitted.

The evaluation of other carrier frequencies for basing handover decisions is easily performed by using the compressed mode in the down-link from a base station to a mobile station on a regular, predetermined basis. After switching to another frequency, the evaluation of the other carrier frequency can be carried out in any suitable fashion, e.g., such as disclosed in U.S. Pat. No. 5,175,867 to Wejke et al. The mobile station MS performs measurements in the down-link (MAHO) and the evaluation can be performed in the mobile station MS and/or the radio network controller RNC.

The mobile station MS performs measurements on other carrier frequencies during the idle part of the compressed mode frame since during this time it is not required to listen to the base station to which it is currently linked. The measurements are relayed to the radio network controller RNC (through the currently linked base station or base stations), providing the means for mobile assisted handover (MAHO). The mobile assisted handover may be otherwise done in a manner derived from the teachings of U.S. Pat. Nos. 5,175,867 or 5,042,082, or other suitable MAHO technique.

The compressed mode is used intermittently at a rate determined by the radio network controller RNC in the preferred embodiment. The radio network controller RNC can determine the frequency of use of the compressed mode based on a variety of factors, such as the radio propagation conditions, the mobile station MS speed, interference factors (e.g., interference load), the relative call density, and the proximity to cell boarders where handover is more likely to be needed. Most frames still use normal mode transmission in typical situations.

Execution of a call handover is also handled in the compressed mode in a preferred embodiment of the present invention. After deciding on handover to a new base station broadcasting on another carrier frequency, the compressed mode is entered. Communication with the old base station(s) is maintained while establishing a new link during the idle part of the frame. Thereby complete synchronization with the new base station is obtained, establishing a new link. The handover is completed by dropping the old link(s) and returning to normal mode transmission. By keeping the old link(s) also after the new link is synchronized, communication to the new and the old base stations simultaneously can be employed (establishing macro-diversity on two carrier frequencies) making the scheme a make-before-break method. This scheme for seamless inter-frequency handover can be used for both up- and down-links.

The duty cycle is the ratio of the information part of a frame to the frame duration and is controlled on a frame by frame basis. For measurements on other frequencies, the duty cycle can remain relatively high (e.g., 0.8) since only a short period of time is needed for the measurement. For execution of macro diversity between two frequencies, the same information is sent on both. Therefore, the duty cycle should be approximately 0.5. The compressed mode is used only intermittently and the normal mode (duty cycle=1) is used the remainder of the time because it is more efficient due to the larger spreading ratio. The radio network controller RNC controls the compressed mode scheme for each individual connection in a preferred embodiment.

The duty cycle can be varied according to the requirements for obtaining synchronization of the link between the mobile station MS and the base station BS. However, if simultaneous communication (macro-diversity) is used, a duty cycle of about 50% is preferred. In this way, the communication channels to the two BS are of equal duty cycle.

To control the transmission quality, the transmission power used during the information part of the frame is a function of the duty cycle, in the preferred embodiment of the present invention. For example, $$P = \frac{P_1}{\text{Duty Cycle}} \quad [W]$$

wherein $P_1$=power used for normal mode transmission.

This increased power is needed to maintain transmission quality in the detector if the duty cycle and thus the spreading ratio is reduced. During the rest of the frame, i.e., the idle part, the power is turned off when compressed mode is used for measuring other carrier frequencies, for example.

The variation in total transmitted power from a base station BS can be smoothed by staggering (spreading in time) the deployment of compressed mode over a number of users in a certain time span. Since signal strength measurement on another carrier frequency is likely to require only a fraction of a frame, the duty cycle can be made high, thereby reducing the variation in the power transmission.

If the mobile station MS is in macro-diversity mode, i.e., the mobile station MS is connected to more than one base station, it is necessary that all connected base stations BS1 and BS2 employ the same transmission mode and duty cycle for any given frame. Macro-diversity may be used to improve call quality, as well as for call handover. This synchronization can be achieved in any suitable fashion, and in a preferred embodiment it is achieved through the radio network controller RNC connecting the base stations BS1 and BS2. For instance, the synchronization can be achieved as taught in U.S. patent application No. 08/075,893 to Teder et al. filed concurrently herewith.

The present invention can be implemented in any suitable system such as illustrated in FIG. 3. The same basic type of transmitter and receiver can be used in both the mobile station MS and the base station BS. On the transmitter side 30, information data is input to a spreading and framing unit 31 wherein the information is slotted coded according to the DS-CDMA technique of the present invention. The spread and framed data is then transferred to a transmitter 32 and thereafter transmitted. The duty cycle and the frame timing are controlled by a mode controller 33 in accordance with the above method. The duty cycle of the relative power of the carrier frequency is also controlled by the mode controller 33 as described above. The mode controller 33 is controlled according to a measurement/handover algorithm. This algorithm can be implemented through software in either the mobile station MS or in the radio network controller RNC, or both, as a given situation makes advantageous.

On the receiver side 35, the mode controller 36 controls the duty cycle of the cartier frequency or frequencies and the frame timing of a radio frequency receiver 37. The radio frequency receiver 37 receives an incoming radio signal and demodulates it according to the duty cycle as controlled by the mode controller 36. The demodulated signal is input to an information decoder 38 the duty cycle and frame timing of which is controlled by the mode controller 36. The mobile station MS also includes a decoder 39 for channels having fixed spreading such as the pilot channel on which measurement of the signal strength of neighboring base stations BS is carried out. The mode controller 36 controls the duty cycle, frame timing (which part of the frame is active), a carrier frequency (or frequencies in the receiver, if receiving from two different frequencies) and the relative power level.

The decision to enter the compressed mode can be made by using the algorithm in the radio network controller RNC. Alternatively, the network may command that every down-link frame should be in the compressed mode, and this command is communicated to the mobile stations MS. Other methods of governing when the compressed mode is used can be easily envisioned.

The present invention's use of normal and compressed mode frames provides the ability to exploit the advantages of slotted transmission/reception in hierarchical cell structures (see also the aforementioned article by H. Eriksson etal) while using DS-CDMA. It is possible to measure other carrier frequencies, thereby providing reliable handover decisions. Further, handover execution between carrier frequencies can be made seamless by establishing a new link before releasing the old one. This can be done without the need for two receivers.

The preceding description of the preferred embodiments are provided to enable any person skilled in the art to make and use the present invention. Various modifications to these embodiments will be readily apparent to those skilled in the art, and the principles described herein may be applied without departing from the scope and spirit of the present invention. Thus, the present invention is not limited to the disclosed embodiment, but is to be accorded the widest scope consistent with the claim below.

What is claimed is:

1. A method of code division multiple access in cellular communications, said method comprising steps of:
   impressing an informational data stream to be transmitted on a higher rate data signature sequence to produce a coded information signal; and
   transmitting said coded information signal on a channel according to a frame structure comprising frames, each frame having a specific time duration,
   said transmitting step includes intermittently transmitting said coded information signal in a compressed mode, using a lower spreading ratio, wherein a frame transmitted in said compressed mode includes a first part having a time duration less than said specific time duration and containing a complete coded information signal, and a second part.

2. A method according to claim 1, comprising a further step of increasing a transmission power level used during a first part of a compressed mode frame as a function of a duty cycle, defined as a ratio of the time duration of said first part to said specific time duration, of said compressed mode frame.

3. A method in accordance with claim 1, wherein no power is transmitted during said second part.

4. A method according to claim 1, wherein said compressed mode is used in one radio link without coordination with use of compressed mode in other radio links.

5. A method according to claim 2, further comprising the step of smoothing variations in total transmitted power by spreading in time use of compressed mode frames over a number of users in a determined time span.

6. A method according to claim 1, wherein a frequency of use of said compressed mode is based on one or a combination of one or more of the following factors: mobile station speed, interference load, relative call density, and proximity to cell boarders.

7. A method according to claim 1, wherein the compressed mode is used in a down-link.

8. A method according to claim 1, wherein the compressed mode is used in both a down-link and an up-link.

9. A method according to claim 1, wherein the compressed mode is used in an up-link.

10. A method according to claim 7, comprising the further step of performing measurements, in a mobile station, of carrier frequencies during a second part of a down-link compressed mode frame.

11. A method according to claim 8, comprising the further step of performing measurements, in a mobile station, of carrier frequencies during a second part of a down-link compressed mode frame.

12. A method according to claim 8, comprising the further step of utilizing said compressed mode when synchronizing on a new carrier frequency and establishing a new radio link during said second part of a compressed mode frame.

13. A method according to claim 12, comprising the further step of maintaining communication on both a presently used radio link and said new radio link, using said second part of a compressed mode frame for communicating on said new radio link.

14. A method according to claim 13, comprising the further step of dropping said presently used radio link and returning to a normal mode frame transmission, wherein a normal mode frame consists of only said coded information during the entirety of said specific time duration.

15. A method according to claim 11, comprising the further steps of utilizing said compressed mode when synchronizing communication on a new carrier frequency and establishing a new radio link during said second part of a compressed mode frame.

16. A method according to claim 15, comprising the further step of maintaining communication on both a presently used radio link and said new radio link using said second part of a compressed mode frame for communicating on said new radio link.

17. A method according to claim 16, comprising the further steps of dropping said presently used radio link and returning to normal mode frame transmission, wherein a normal mode frame consists of only said coded information during the entirety of said specific time duration.

18. A method according to claim 10, comprising the further step of performing handover evaluation using said measurements of a carrier frequency differing in frequency from a carrier frequency upon which a present link is established.

19. A method according to claim 11, comprising the further step of performing handover evaluation using said measurements of a carrier frequency differing in frequency from a carrier frequency upon which a present link is established.

20. A method according to claim 19, comprising the further steps of utilizing said compressed mode when synchronizing communication on a new carrier frequency and establishing a new link, based on said handover evaluation, during said second part of a compressed mode frame.

21. A method according to claim 20, comprising the further step of maintaining communication on both a presently used radio link and said new radio link, using said second part of a compressed mode frame for communicating on said new radio link.

22. A method according to claim 21, comprising the further steps of dropping said presently used radio link and returning to a normal mode frame transmission, wherein a normal mode frame consists of only said coded information during the entirety of said specific time duration.

23. A method according to claim 8, comprising the further step of utilizing said compressed mode when executing seamless handover by
   performing communications on a present radio link during said first part,
   synchronizing communication on a new carrier frequency during said second part,
   establishing a new radio link during said second part,
   dropping the present link when communication on said new radio link has been established, and
   performing communications on the new radio link using a normal mode transmission, wherein a normal mode frame consists of only said coded information during the entirety of said specific time duration.

24. A method according to claim 11, comprising the further step of utilizing said compressed mode when executing seamless handover by
   performing communications on a present radio link during said first part,
   synchronizing communications on a new carrier frequency during said second part,
   establishing a new radio link during said second part,
   dropping the present link when communication on said new radio link has been established, and
   performing communications on the new radio link using a normal mode transmission, wherein a normal mode frame consists of only said coded information during the entirety of said specific time duration.

25. A method according to claim 19, comprising the further steps of utilizing said compressed mode when executing seamless handover by
   performing communications on a present link during said first part,
   selecting a new carrier frequency based on said handover evaluation,
   synchronizing communication on said new carrier frequency during said second part,
   establishing a new radio link during said second part,
   dropping the present link when communication on said new radio link has been established, and
   performing communications on the new radio link using a normal mode transmission, wherein a normal mode frame consists of only said coded information during the entirety of said specific time duration.

26. An apparatus for transmitting information in a code division multiple access system transmitting information in frames of specific time duration, said apparatus comprising:
   means for spreading and framing data in either a normal mode, wherein a normal mode frame consists of only said coded information during the entirety of said specific time duration, or, a compressed mode, wherein frames include a first part of less than said specific time duration, said first part containing a complete coded information signal, and a second part, said spreading and framing means including an input and an output;
   means for controlling which of said compressed mode and said normal mode is used in said spreading and framing means; and
   means for transmitting said coded information signal output of said spreading and framing means.

27. The apparatus according to claim 26, further comprising:
   means for receiving radio frequencies;
   an information decoder, operatively connected to said means for receiving, capable of decoding information in accordance with said compressed mode and said normal mode; and
   means, operatively connected to said information decoder, for controlling which of the compressed mode and the normal mode is used in said information decoder.

28. The apparatus according to claim 27, wherein said mode control means selects a mode according to a measurement/handover algorithm.

29. The apparatus according to claim 26, wherein said apparatus forms part of a mobile station.

30. The apparatus according to claim 29, further comprising means for decoding channels with fixed spreading ratios.

31. The apparatus according to claim 26, wherein said apparatus is part of a base station.

32. The apparatus according to claim 28, wherein part of said algorithm is implemented in a mobile station and part of said algorithm is implemented in a base station.

33. The apparatus according to claim 26, wherein one of said apparatus is located in a mobile station and another of said apparatus is located in a base station.

34. The apparatus according to claim 26, wherein power supplied to said means for transmitting during a first part of a frame is controlled by said mode control means.

35. The apparatus according to claim 27, wherein frame timing of said receiver means is controlled by said mode control means.

36. The apparatus according to claim 29, wherein a duty cycle of the compressed mode frame of said receiver means is controlled by said mode control means.

37. A method of code division multiple access in cellular communications, said method comprising steps of:
   impressing an informational data stream to be transmitted on a higher rate data signature sequence to produce a coded information signal; and
   transmitting said coded information signal on a channel according to a frame structure comprising frames, each frame having a specific time duration,
   said transmitting step includes transmitting said coded information signal in a compressed mode, using a lower spreading ratio, wherein said compressed mode frame includes a first part containing all of said coded information signal and a second part.

* * * * *